United States Patent [19]

Bohm et al.

[11] 4,027,046

[45] May 31, 1977

[54] FINING WITH ALUMINATE-MODIFIED SILICA SOL

[75] Inventors: Benno Bohm, Leverkusen; Hermann Genth, Krefeld-Bockum; Peter Schober, Cologne; Peter Simons, Schildgen, all of Germany

[73] Assignee: Bayer Aktiengesellschaft, Leverkusen, Germany

[22] Filed: Feb. 11, 1975

[21] Appl. No.: 549,119

[30] Foreign Application Priority Data

Feb. 23, 1974 Germany ............................ 2408896

[52] U.S. Cl. ........................ 426/330.3; 426/330.4; 426/330.5; 426/423
[51] Int. Cl.² ..................... A23B 7/00; C12G 1/00; C12G 1/02
[58] Field of Search ......... 426/330.3, 330.4, 330.5, 426/422, 423, 424

[56] References Cited

UNITED STATES PATENTS

| 1,458,427 | 6/1923 | McGeorge | 426/423 |
| 1,766,428 | 6/1930 | Cozzolino | 426/330.4 |
| 2,163,200 | 6/1939 | Heimann | 426/423 X |
| 2,291,624 | 8/1942 | Heimann et al. | 426/423 |
| 2,823,126 | 2/1958 | Little | 426/422 |
| 2,892,797 | 6/1959 | Alexander et al. | 252/313 |
| 3,436,225 | 4/1969 | Raible | 426/330.4 |

*Primary Examiner*—Joseph M. Golian
*Attorney, Agent, or Firm*—Burgess, Dinklage & Sprung

[57] ABSTRACT

In the fining of a protein-containing beverage such as a fruit juice or a grape or fruit wine or a must therefor in unfermented, partially fermented or fermented form, wherein silica sol is added to said beverage, and the deposit formed is separated off, the improvement which comprises adding an aluminate-modified silica sol to said beverage, whereby the protein removing and flocculation occurs more readily than with unmodified silica sol. The aluminate is preferably added in the form of sodium aluminate. Optionally gelatin is also added.

6 Claims, No Drawings

FINING WITH ALUMINATE-MODIFIED SILICA SOL

This invention relates to a process for fining beverages essentially containing protein, amino acids and/or carbohydrates, more especially grape wines, fruit wines and the musts required for preparing these beverages in unfermented, partly fermented or fermented form, or even fruit juices.

When a beverage, for example wine, is "fined", it is generally prepared for clear filtration, stabilized against clouding (haze) and, if necessary, corrected in regard to aroma, flavor and color. The primary object of the fining agent is to convert the beverage from a colloidally clouded form, in which it is impossible or difficult to filter, into a form in which it can be rapidly and satisfactorily filtered. Another object of the fining agent is to chemically or physically bind and flocculate soluble substances which could cause the beverage to cloud at some later stage. Errors in aroma, flavor and color also have to be eliminated or at least minimized. During these various operations the beverage should not undergo any appreciable change in structure; in other words only the undesirable ingredients should be removed.

It is already known that wines and juices can be fined by using gelatin. It has been found in this connection that gelatin primarily combines with tannic compounds/polyphenols and flocculates them. Thus, in addition to its clarifying effect which is attributable to the adsorption force of the gelatin/tannic compounds, fining with gelatin also has a flavor-correcting effect. It is also known that the clarifying effect of gelatin can be improved by adding tannin. Nowadays, however, silica aquasols are generally used instead of tannin.

Silica aquasols, generally known as silica sols, are colloidal solutions of silicon dioxide in water. The silicon dioxide is present in the form of spherical, dense, uncrosslinked and surface-hydroxylated particles. The colloid particles have a particle size of from about 2 to 200 m$\mu$. It is often expressed by the specific surface area which is easy to measure and correlates with the particle size amounting to approximately 50 to 600 m$^2$/g according to BET and indicating the surface area which would be developed by 1 g of dried SiO$_2$ from the aquasol.

There are already various processes for producing silica sols of this kind. The sols are commercially available in the form of weakly alkaline and weakly acid solutions with a concentration of 30% (expressed in % by weight) although it is readily possible to prepare concentrations of from 15 to 60% of SiO$_2$.

Although in fining with gelatin it has been possible significantly to improve both the clarifying effect and the elimination of tannic compounds by using silica sols, it is still not readily possible even today to flocculate both components quickly and completely. In addition, the volume of the deposite formed (referred to hereinafter as "haze deposit") should also be kept to a minimum, in other words every effort should be made to obtain as dense and as quickly settling a "haze deposit" as possible.

Another serious disadvantage of conventional gelatin/silica sol fining is that it only removes very small quantities of high molecular weight, thermally labile, colloidally dissolved protein compounds which are responsible for hazing with the result that it is not possible in this way to obtain any protein stabilization. It is regarded as a particular disadvantage that, hitherto, silica sols only flocculated with gelatin protein, but not with the beverage protein, so that they could only be used in combination with gelatin.

Hitherto, it has been neccessary where required to carry out protein stabilization, for example of wine, by treatment with bentonites, in addition to gelatin/silica sol fining. One of the major disadvantages of this method of treatment is that, in practice, it involves two different operations. Another disadvantage is that bentonite varies in its activity, depending upon its origin and its industrial preparation. In addition, bentonite is not selective, with the result that the structure of the beverage can be excessively altered.

It is accordingly an object of the invention to provide an improved process for the fining of such beverages.

This and other objects and advantages are realized in accordance with the present invention which relates to an improvement in the fining of a protein-containing beverage such as a fruit juice or a grape or fruit wine or a must therefor in unfermented, partially fermented or fermented form, wherein silica sol is added to said beverage, and the deposit formed is separated off. In accordance with the improvement, an aluminate-modified silica sol is added to said beverage whereby protein removing and floccation occurs more readily than with unmodified silica sol. Optionally gelatin is also added to the beverage with the silica sol.

It has surprisingly been found that beverage protein colloids can be precipitated with silica sols providing the silica sols used have been modified with aluminum compounds, such as potassium, sodium, lithium or tetramethyl ammonium aluminate, preferably with sodium aluminate.

Processes for producing silica sols modified with aluminum compounds are already known. One method for producing sols of this kind is described, for example, in U.S. Pat. No. 2,892,797.

Modified sols of this kind are characterized by the fact that the negative charge in the individual colloid particles is increased, as also reflected in the zeta potential value.

The modification of silica sols with even small quantities of sodium aluminate is sufficient to produce a reaction with the protein beverage and, hence, an improvement in the protein stability of beverages.

Aluminum-modified sols have been found to show the following advantages over untreated sols in the fining of beverages:

1. Aluminum-modified sols are able on their own to react with and precipitate beverage protein colloids, thus increasing the protein stability of the beverage.
2. Aluminum-modified sols act better in combination with gelatin than normal sols. The deposit is more dense and settles more quickly (thinner, more dense haze deposit).
3. The reduction in tannic compounds content attributable to the effect of the gelatin (as determined by analysis of the anthocyanidines in accordance with K. Wucherpfennig und K. D. Millies, Deutsche Weinbau-Jahrbuch 1973, pages 157–160) is greater where the modified silica sols are used than where normal sols are used.

The process according to the invention for fining with gelatin/silica sol using the modified silica sol is carried out in conventional manner.

The two components are separately mixed with the beverage to be fined, preferably by means of metering pumps or other metering systems, during the tapping of wine or during similar operations in the production of fruit juice.

The modified silica sol may be used in amounts of from 5 to 500 g/hectoliter (calculated as a 30% by weight sol), preferably of from 10 – 100 g/hectoliter.

Optimum quantities and quantitative ratios have to be determined by preliminary tests. In general, it is advisable to add about 10 g to 100 g of modified 30% silica sol, i.e. 3 to 30 g of silica, per hectoliter of beverage. In individual cases, however, it may be desirable considerably to exceed this quantity.

It has also been found that, in every case hitherto investigated, the aluminum-modified silica sols flocculate instantaneously providing they are used in the correct ratio with gelatin. The ratio by weight of gelatin to 30% silica sol generally amounts to between 1:3 and 1:10, although in individual cases it can be as much as about 1:20, i.e., the gelatin to silica ratio ranges from about 1:0.9-6. In the context of the invention, gelatins are substances of the type described, for example in "Flussiges Obst" 9/1972, pages 388 to 406, the disclosure of which is incorporated herein by reference.

By gelatins there are understood edible gelatins, which meet the requirements of the German Pharmacopoeia VII and which may be used in the treatment of wine, and also less purified types of gelatin. In other words these are protein substances which are prepared by careful hydrolysis of animal material containing collagen. Natural sources for the preparation of gelatin are pigskins, animal skins, e.g. cowhide and calfskin, as well as bones. The preparation of the gelatins can be carried out in principle according to two different processes. In the classical, two-stage lime-alkaline process the collagen-containing natural material is exposed for several months to the action of milk lime: after a suitable method of purification the material is then converted by heating into gelatin protein. In this way the so-called "B" gelatin is prepared (derived from the English word "basic"). Over the past few years the newer process for the production of gelatin has gained increasingly wide acceptance. It is based on swelling and decomposition of the crude collagen by means of a strong acid and is preferably used to hydrolyze the collagen of the pigskin. The gelatin produced by this process is type "A" (derived from the English word "acid").

The gelatins produced according to the described processes have different compositions and different properties depending on the type of production. In general, the gelatins can be characterized for practical use by indication of their strength which gelatin gels develop under certain test conditions. Thus the Bloom number of a gelatin can be spoken of which indicates its gelatinous strength and which in some way depends on the size and structure of the protein molecule.

Gelatins covered by the scope of the invention, may be gel-forming gelatins from the entire Bloom number range and non gel-forming gelatins produced by subsequent enzymatic decomposition.

The haze deposit formed after flocculation is more dense than in cases where normal silica sols are used and settles more quickly. In addition to gelatin, other additives can be used, for example polyvinyl pyrrolidone, casein, blood albumin powder, skim milk, skim milk powder, whey powder and isinglass.

Single-component fining in accordance with the invention using modified silica sols can be carried out in the same way a two-component (gelatin/silica sol) fining, except that the silica sol is generally used in larger quantities than in 2-component fining. The silica sol is best added to the beverage to be fined during tapping, followed after flocculation and settling of the haze-deposit by filtration, centrifuging or decantation. The quantity of fining agent has to be determined by preliminary tests, being governed by the protein content of the beverage. As described in the examples, the protein beverage is spontaneously flocculated with silica sol within very wide quantitative limits.

The silica sols used are distinguished by an aluminum oxide content emanating, for example, from sodium aluminate of about 0.03 to 1.0% by weight, based on aqueous silica sol, i.e., about 0.1 to 3.3% by weight based on silica. Although it is also possible in accordance with the invention to use silica sols with an aluminum oxide content in excess of 1.0%, silica sols of this kind do not afford any appreciable advantages.

The specific BET surface area of the sol is not particularly critical so far as the claimed fining effect is concerned, and it is possible to use standard commercial-grade silica sols with specific surface areas of about 50 to 600 $m^2/g$ and, appropriately modified, even special types exceeding these limits.

These concentration of the standard commercial-grade silica sols is about 15 to at most 60%, 30% silica sols being particulaly common.

The silica sols may be used in concentrated form, i.e., in the form of 30% to 60% sols, preferably in the form of 30% sols, although then can also be diluted before application to any concentration below 40% without any adverse effect upon the effectiveness or properties of fining. The amount of silica added as silica sol generally ranges from about 1.5 g to 150 g, and preferably about 3 g to 30 g, per hectoliter beverage.

The process according to the invention is illustrated by the following Examples:

COMPARISON EXAMPLE

This example describes the effect of a normal unmodified 30% silica sol with a specific BET surface area of 160 $m^2/g$.

1 liter batches of a hazy, protein-rich grape wine, pressed from a Riesling vine, which in its unstabilized unfined form contains such a quantity of protein that 447 mg of nitrogen per liter are found by Kjeldahl's method, were mixed with 2, 4, 26, 10, 15 and 20 ml, respectively, of silica sol. In no case was there any appreciable flocculation. 3 g of a 10% aqueous gelatin solution and then 3 ml of silica sol were added with stirring to 1 liter of the same starting wine. The dense haze produced flocculated out after a few minutes and settled overnight, giving a haze deposit of 12% by volume. After the fined wine has been filtered off, its nitrogen content was again determined by Kjeldahl's method. This amounted to 430 mg per liter, in other words had not undergone any appreciable change in relation to the unfined wine.

In addition, heat tests were carried out both on the fined wine and on the starting wine by adding 5 ml of a saturated ammonium sulfate solution to 95 ml of wine, followed by storage for 9 hours at 60° C and then for 15 minutes at 0° C. The extinction at 650 m$\mu$ was measured by means of a photometer as a measure of the protein-induced hazing which occurs. In both cases, it amounted to 0.17.

EXAMPLE 1

1 liter batches of the unfined, protein-rich grape wine from the Comparison Example were mixed with 2,4,6,10,15 and b 20 ml, respectively, of silica sol modified by treatment with sodium aluminate. The modified silica sol contained 0.36 g of $Al_2O_3$ per 100 g of silica sol, introduced in the form of sodium aluminate, and had a specific BET surface area of 160 $m^2/g$ In every case, the silica sol flocculated out, the wine clarifying through haze deposition. The test with 6 ml of the modified sol was selected for the purposes of analytical determination, a distinctly visible flocculation occurring after only a few minutes and settling overnight to give a haze deposit of 4% by volume. After the haze deposit had been filtered off, the nitrogen content was determined by Kjeldahl's method, amounting to 210 mg per liter. The heat test produced an extinction of 0.08 at 650 $m\mu$.

EXAMPLE 2

1 liter batches of a tannin-rich cider containing 280 mg of leucoanthocyans per liter (as determined in accordance with K, Wucherpfennig und K. D. Millies, Deutsches WeinbauJahrbuch 1973, pages 157–160) were fined with 0.3 g of an acid-limed gelatin with a Bloom number of 90 (in the form of a 10% aqueous solution) and (a) 2.5 ml of silica sol with a specific BET surface area of 160 $m^2/g$, or (b) 2,5 ml of a 30% silica sol modified with sodium aluminate (0.24 g of $Al_2O_3$/100 g of silica gel) with a BET surface area of 160 $m^2/g$. Both samples flocculated out within a few minutes, the aluminate-modified sol flocculating out slightly more quickly than the comparison sample. The cider fined with the comparison sol formed a haze deposite of 6% by volume after a settling time of about 15 hours, while the silica sol according to the invention formed a haze deposit of 4% by volume in the cider. The leucoanthocyan content of the comparison sample fell to 106 mg per liter while that of the sample fined with the aluminate-modified silica sol fell to 74 mg per liter.

It will be appreciated that the instant specification and examples are set forth by way of illustration and not limitation, and that various modifications and changes may be made without departing from the spirit and scope of the present invention.

What is claimed is:

1. In the fining of a fruit juice or a grape or fruit wine or a must therefor in unfremented, partially fermented or fermented form, wherein a flocculant is added to said beverage, and the deposit formed is separated off, the improvement which comprises adding an aluminate-modified silica sol to said beverage as said flocculant, whereby protein removing and flocculation occur more readily than with unmodified silica sol.

2. The process according to claim 1, wherein the silica sol is modified with sodium aluminate.

3. The process according to claim 1, wherein about 1 part by weight of gelatin is also added to the beverage for each 0.9 to 6 parts by weight of silica.

4. The process according to claim 1, wherein the silica particles range in size from about 2 to 200 millimicron.

5. The process according to claim 1, wherein the silica sol has an aluminum oxide content of about 0.1 to 3.3% by weight of silica.

6. The process according to claim 5, wherein the aluminum compound is present in the form of sodium aluminate, the silica particles range in size from about 2 to 200 $m\mu$, the silica sol has a concentration of about 30 to 60% and is added in about 5 to 250 g per hectoliter, i.e., a silica amount of from 1,5 to 150 g; and gelatin is also added in a gelatin to silica weight ratio of about 1:0.9–3.

* * * * *